Nov. 1, 1949.　　　O. J. HUELSTER　　　2,486,412
FASTENER
Filed Aug. 7, 1943
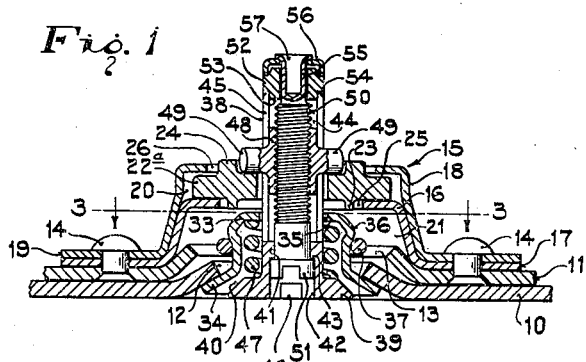
Fig. 1
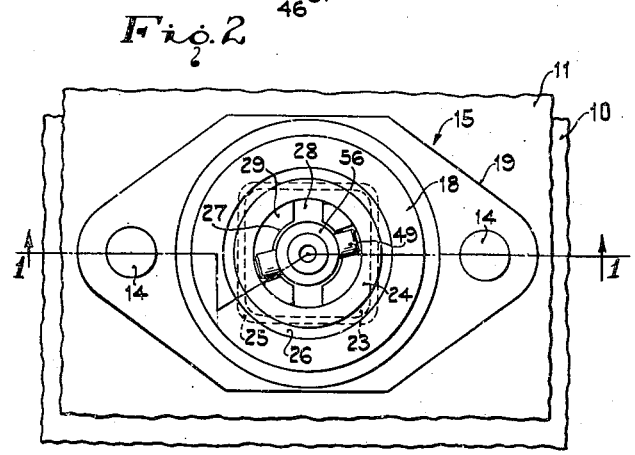
Fig. 2
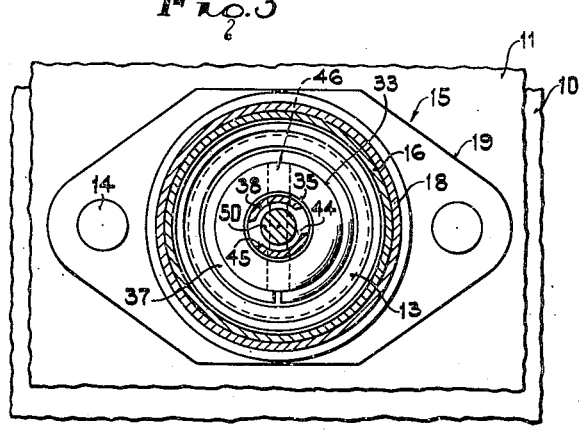
Fig. 3
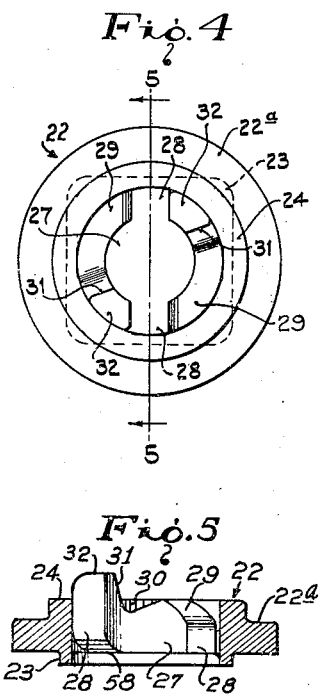
Fig. 4
Fig. 5
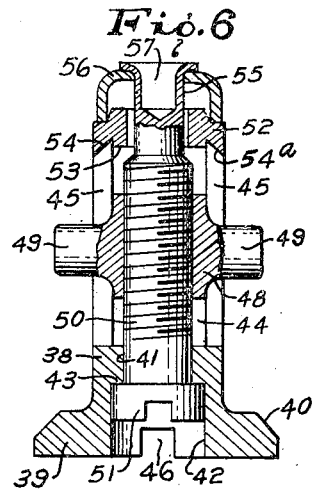
Fig. 6
INVENTOR.
Otto J. Huelster
BY
F. Bascom Smith
ATTORNEY Patented Nov. 1, 1949

2,486,412

UNITED STATES PATENT OFFICE 2,486,412

FASTENER

Otto J. Huelster, Waterbury, Conn., assignor to Scovill Manufacturing Company, Waterbury, Conn., a corporation of Connecticut Application August 7, 1943, Serial No. 497,721

12 Claims. (Cl. 24—221)

This invention relates to fasteners, and more particularly to fasteners of the cam and stud type, now extensively used in aircraft for detachably securing cowlings, covers, hoods, and other parts to mounting structures.

The studs of fasteners of the above type are manufactured in various lengths to enable the fasteners to be used with parts of various thickness. It is thus necessary for the user to have on hand a quantity of studs of different lengths so as to have available studs of the proper length to fit a particular thickness of parts or plates, in order to prevent undue plate separation in use. This requires the user to select from a number of studs, which is wasteful of time, and may result in an improper selection.

Frequently fasteners of this type must be used to clamp parts that are not in true alinement, due to manufacturing tolerances or temperature changes, and when misalinement is present difficulty is had in bringing the stud into engagement with the cam. Moreover, if the plates to be fastened are curved, difficulty is experienced in engaging the stud with the cam even if the parts are not actually out of alinement. Another difficulty with fasteners now in use results from damage to the cross pin carried by the stud and the consequent need for replacing the stud. If the latter is not readily removable from its supporting part or plate an effort is usually made to remove the cross pin and replace it with a perfect pin. Such an operation is time consuming, however, and difficulty is experienced in securing the new pin rigidly to the shank of the stud.

One of the objects of the present invention is to provide a novel fastener of the above type adapted for use with parts or plates of various thicknesses.

Another object of the invention is to provide a novel fastener which is so constructed that the laterally projecting elements of the stud, commonly referred to as the cross pin, may be moved relative to the head of the stud to increase or decrease the effective length thereof, whereby the fastener may be used with parts or plates of various thickness.

Another object is to provide a novel fastener, which may be quickly engaged or released, even when the parts to be clamped or unclamped are not in exact alignment.

A further object is to provide a novel stud for a fastener of the above type which is so constructed that the same may be locked in clamping position and one adapted to be associated with a stud assembly so formed that the pressure employed for holding the parts or plates in clamped position may be increased or decreased.

The above and other objects of the invention will appear more fully in the following detailed description and in order to clearly understand the invention, reference is had to the accompanying drawing illustrating one embodiment thereof.

In the drawing, wherein like numerals refer to like parts throughout the several views, Fig. 1 is a sectional view, taken substantially on the line 1—1 of Fig. 2, of a fastening device embodying the present invention;

Fig. 2 is a plan view looking down on the parts of Fig. 1;

Fig. 3 is a horizontal section taken on line 3—3 of Fig. 1;

Fig. 4 is a plan view of the cam block shown in Fig. 1;

Fig. 5 is a section on line 5—5 of Fig. 4; and

Fig. 6 is an enlarged showing of the stud and the elements carried thereby, the view being taken substantially on the line 1—1 of Fig. 2.

The present invention is illustrated, for example, in connection with a cowling plate and the frame of an airplane, portions of the plate and frame being indicated at 10 and 11 respectively (Fig. 1). Plate 10 and frame 11 are provided with inwardly flared or drifted circular openings 12 and 13 respectively, which are in axial alinement with each other when said plate and frame are in assembled relation, the opening 13 being larger in diameter than the opening 12 for purposes hereinafter described.

Secured to the inner surface of frame 11 as, for example, by rivets 14, and enclosing the opening 13 in said frame, is a socket indicated generally at 15 (Fig. 1). This socket 15 is formed by an inner, thin metal, cup-like shell 16 provided with a laterally extending flange 17, and an outer, thin metal, cup-like shell 18 provided with a laterally extending flange 19. The shells 16 and 18 are of such construction that when said shells are nested to form the socket 15, spaces 20 and 21 (Fig. 1) are provided between the outer and inner shells 18 and 16, and between the latter shell and the frame 11 respectively, for purposes hereinafter described.

Disposed in the space 20 between the shells 16 and 18 is the circular flange 22a of a cam block 22 which is provided on the lower side (as viewed in Fig. 1) with a square pad or flange 23, and on the upper with a circular flange or boss 24 (Figs. 1, 4 and 5). Flange 23 projects loosely into a square opening 25 formed in the inner shell 16, and boss 24 projects into a circular opening 26 formed in the outer shell 18 (Figs. 1 and 2). The cam block 22 is thus held against rotation by square flange 23 but is adapted to slide or float in the space 20 in any direction parallel with the face of frame 11, for purposes to be hereinafter described. After the cam block is positioned between the shells 16 and 18, the latter are secured together, preferably by spot welding, to simplify handling thereof. It will be understood, however, that the shells 16 and 18 may be secured together in any other suitable manner known in the art.

Referring to Figs. 4 and 5 of the drawing, the floating cam block 22 is provided with a central opening 27, which is disposed in axial alinement with the opening 13 in the frame 11, and is also provided with two diametrically opposite slots 28. Cam block 22 is further provided on the top side thereof and on opposite sides of slots 28 with a pair of diametrically opposite cam surfaces 29 which are inclined upwardly from said slots and terminate in a pair of diametrically opposite recesses 30 and abutments 31 formed by extensions 32 on said cam block.

With the construction thus far described, it will be noted that the socket 15 and floating cam block 22 carried thereby constitute the cam assembly of the fastener fixed to the frame 11 of the airplane. The stud assembly of the fastening device which cooperates with the floating cam block 22 for yieldingly clamping the detachable cowling plate 10 to frame 11, is carried by plate 10 and is constructed, mounted, and operated as follows:

Extending loosely through the drifting opening 12 in cowling plate 10 is a thin metal, spring retainer or cup member 33 (Figs. 1 and 3) which is provided on the lower end thereof with an outwardly depending skirt 34 that is inclined or tapered in conformity with the contour of the drifted hole 12 for direct engagement with the cowling plate. The spring retainer 33 is provided at its top or inner end with a central opening 35, and adjacent said end with an outwardly projecting annular bead 36 which is smaller in diameter than the opening 12 in the cowling plate 10 so that the retainer may easily be applied to said plate and quickly removed therefrom. Retainer 33 is held against displacement from cowling plate 10 by a split ring 37 which is engaged over said retainer between the annular bead 36 thereof and said cowling plate, and when so engaged is expanded to a diameter larger than the diameter of opening 12. It will be noted that when plate 10 is attached to frame 11 the spring retainer 33 extends into the space 21 through the drifted opening 13 in said frame, the opening 13 providing sufficient clearance for the retainer 33 and ring 37.

Loosely carried by retainer 33 and projecting through the opening 35 therein is a stud 38 (Fig. 1) provided on its lower or outer end with an enlarged head 39 which is beveled, as at 40, to provide sufficient clearance between said head and the inner surface of the skirt 34. Stud 38 has formed therein a central opening 41 which is counterbored at its opposite ends to provide a shallow pocket 42 and a shoulder 43 at the bottom or outer end thereof, and with a deep pocket 44 at the top or inner end thereof. The stud 38 is further provided with two diametrically opposite slots 45 traversing the pocket 44 and extending the full length of said pocket. The head 39 of the stud 38 is slotted as indicated at 46 to receive a screw driver or other suitable tool for rotating the stud. Surrounding stud 38 and interposed between the stud head 39 and retainer 33 is a compression spring 47 for yieldably holding said retainer against cowling plate 10, and for yieldably applying clamping pressure to said stud as hereinafter described.

Fitted for sliding movement within and along the pocket 44 in the stud 38 is an internally threaded, cylindrical nut or sleeve 48 having secured thereto, or formed integrally therewith, two laterally extending pins 49 which project through the slots 45 in said stud. Sleeve 48 and its pins 49 constitute a cross-pin member. The distance between the outer ends of the cross pins 49 is less than the diameter of the opening 12 in the cowling plate 10, and slightly less than the distance between opposite ends of the slots 28 in the cam block 22 to permit said pins to freely pass through said opening and slots.

Arranged within the pocket 44 in the stud 38 is a screw 50 having threaded engagement with sleeve 48. This screw 50 extends through opening 41 in stud 38 and is provided on its lower or outer end with an enlarged slotted head 51 which is disposed within the pocket 42 and abuts against the shoulder 43. Since sleeve 48 is held against rotation relative to the stud 38 by the pins 49 engaged in slots 45, rotation of the screw 50 in opposite directions will cause the cross-pin member 48, 49 to move axially in opposite directions along the stud 38, thus increasing or decreasing the distance between said pins and the head 39 of said stud in accordance with the thickness of cowling 10 and the frame 11.

To prevent spreading or contracting of the walls of the stud 38 surrounding the pocket 44 which would result in excess play or binding of the nut or sleeve 48 in said pocket, the stud 38 has engaged therewith at its top or inner open end a friction bushing 52. This friction bushing 52 is provided on its lower end, as viewed in Fig. 1, with a reduced portion 53 which extends into the pocket 44, and with a beveled or tapered groove 54 that engages the corresponding beveled or tapered upper end 54a of the stud 38.

The bushing 52 is connected with adjusting screw 50 for rotation therewith relative to stud 38, and by reason of the frictional relationship at surfaces 54, 54a the bushing 52 will also rotate with stud 38, screw 50 and cross-pin member 48, 49 as a unit when said stud is rotated as hereinbefore described. As shown, screw 50 is formed at its upper end with a reduced neck portion 55 which extends through a suitable opening formed in bushing 52, and also through a suitable opening formed in a resilient bearing cap 56 engaged with said bushing. The bearing cap 56 is held in engagement with bushing 52, and the latter is held in frictional contact with the stud 38 by flanging or turning the end of the reduced neck portion 55 over the bearing cap 56, said neck portion 55 being bored out, as indicated at 57, to provide a thin wall for this purpose. The frictional contact of the bushing 52 with the end of stud 38 at surface 54 is sufficient to prevent any accidental relative rotation of stud 38 and adjusting screw 50 and, hence, any accidental rotation of nut 48, 49 from a preadjusted position on screw 50. Bearing cap 56 is preferably forced over the upper reduced end of bushing 52 by a drive fit to obtain a non-rotatable connection between said cap 56 and bushing 52. It will be noted that frictional rotation can take place between beveled surfaces 54, 54a and these beveled surfaces serve two functions: First, they provide an increased bearing surface whereby a higher degree of friction is obtained and, second, since the stud 38 is split for a major portion of its length by slots 45 the beveled surfaces hold the upper split ends of said stud as viewed in Fig. 6 against lateral spreading movement.

The socket 15 with the floating cam block 22 having been secured to the frame 11, and the spring retainer 33, spring 47, and stud 38 with the adjustable cross pins 49 having been attached to the cowling 10, as hereinbefore described, said cowling is now in readiness to be yieldingly and detachably clamped to said frame, as follows: Assuming that the cross pin member 48, 49 have been properly positioned along the stud 38 in accordance with the thickness of plate 10 and frame 11, the stud 38 is inserted into the opening 27 in the cam block 22 and rotated in either direction until the cross pins 49 are in line with and pass through the slots 28 in said cam block. Preferably cross-pin member 48, 49 is passed through opening 27 and slots 28 in cam block 22 by rotating stud 38 in a counterclockwise direction as viewed in Figs. 2 and 4. Pins 49 will be thus rotated against the underside of cams 29, 30, 31, and preferably the underside of cam surfaces 29 directly below extensions 32, as viewed in Figs. 4 and 5, are rounded as at 58 (Fig. 5) whereby pins 49, moving along said surfaces 58, freely enter slots 28 in a plane above the underside of the cam surfaces opposite the portions designated by the reference character 29. Thus any effort to move pins 49 past slots 28 in a counterclockwise direction, as viewed in Figs. 2 and 4, causes said pins to engage the diametrically opposite ends of cams 29, 30, 31 so that the user knows that his pins 49 are now in alignment with the slots and he readily passes stud 38 with the cross-pin member 48, 49 through opening 27 and slots 28. Stud 38 is then rotated by a screw driver, or other suitable tool, causing the cross pins 49 to ride up and along the cam surfaces 29 against the tension of the compression spring 47, and snap into the recesses 30 and into engagement with the abutments 31. The cowling 10 will thus be yieldingly but firmly clamped against frame 11, and the stud 38 due to engagement of the cross pins 49 in the recesses 30 will be held against accidental rotary movement.

In the event the openings 12 and 13 in the cowling plate 10 and frame 11 are not in proper alinement, the stud 38 upon first entering the opening 27 in the cam block 22 will cause said cam block to float or move to a position, within prescribed limits, where the opening 27 thereof is in axial alinement or substantially so with said stud, thus enabling the stud 38 and cross pins 49 to enter and pass through the opening 27 and slots 28, respectively, in the cam block 22.

Should it be desired to positively lock the stud 38 against movement after the cowling 10 is clamped in position, this can be accomplished by rotating adjusting screw 50 with the aid of a screw driver, or other suitable tool, in a direction to cause the head 39 of the stud to move toward the cross pins 49, thereby increasing the tension of the spring 47 to collapse the same to such an extent that relative movement between the head 39 and pins 49 upon further and full collapse of the spring is less than the distance between the bottom of the recesses 30 and the high points of portions 29 of the cam surfaces.

In the event it is desired to detach the stud 38 from the cowling 10 for repairs or replacement purposes, this can quickly be accomplished by simply removing the split ring 37 from spring retainer 33 after the cowling is unclamped from frame 11, by a reversal of the above described operations, whereupon retainer 33, spring 47, stud 38 and parts carried thereby may be removed from the cowling as a single unit. The retainer is preferably made of a wear resisting metal, such as steel, and its use avoids the necessity for the usual eyelet to protect the surface of plate 10 adjacent opening 12.

It will thus be seen that due to the adjustability of the cross pins 49 along the stud 38, a fastening device is provided which will accommodate all thicknesses of plates within the range of adjustment of said cross pins, and while the stud 38 with the adjustable cross pins 49 is herein illustrated and described in cooperation with a floating cam block 22, said stud and adjustable cross pins are equally adaptable for use with a fastening device wherein the cam or cam block is secured to or forms an integral part of the socket.

Due to the provision of the floating cam block 22, irregularities within prescribed limits in the alinement of the plate openings are automatically compensated for, and while said type of cam block is herein illustrated and described in association with adjustable cross pins, it is equally adaptable for use in association with a cross pin or cross pins that are secured to or form an integral part of the stud.

It is, therefore, to be expressly understood that while one embodiment of the present invention is herein illustrated and described with more or less particularity, said invention is not limited to said embodiment or otherwise than by the terms of the appended claims.

What is claimed is:

1. In a fastener of the cam and stud type, a stud, a pair of laterally extending members mounted on said stud, threaded means for moving said laterally extending members longitudinally of the stud, and means for holding said laterally extending members in a selected longitudinal position.

2. In a fastener of the cam and stud type, the combination of a stud having an enlarged head, a cross pin member carried by the stud, means for moving said cross pin member axially relative to the shank of the stud, and means for holding said cross pin member in a selected longitudinal position.

3. A stud assembly for use in a device of the class described comprising a stud having an enlarged head and a hollow, slotted shank, a cross pin member positioned in the hollow shank with the opposite ends thereof projecting through the slots in the shank, and a threaded member carried by the stud and having threaded engagement with the cross pin member whereby the latter may be moved toward and away from said head.

4. A rotatable stud for use in a fastener of the cam and stud type comprising a stud having an enlarged head and an open ended, hollow, slotted shank, a cross pin member positioned in the hollow shank and having the opposite ends thereof projecting laterally through the slots in the shank, a threaded member in said shank and having threaded engagement with the cross pin member for moving the latter in either direction axially of the shank, a bushing surrounding said member and having engagement with the end of the shank opposite the head, and a bearing cap surrounding said threaded member and having engagement with said bushing and member for supporting the latter.

5. In a stud assembly for use in a device of the class described, a stud having an enlarged head and a hollow, slotted shank, a cross-pin member in said hollow shank having the opposite ends thereof projecting through the slots in said shank and a headed screw carried by the stud and extending axially thereof, said screw passing through said cross-pin member and having threaded engagement therewith, rotation of the screw effecting longitudinal movement of the cross-pin member in the hollow, slotted shank.

6. A stud for a rotary operative fastener of the kind described which stud comprises in combination a head, a shank, and a radial arm extending from the shank, the radial arm being fixed with respect to rotative movement of the shank and adjustable axially of the shank to different positions with respect to the head and means for positioning the radial arm in different positions with respect to the head including a threaded shank and a threaded sleeve carrying the radial arm.

7. A stud for a rotary operative fastener of the kind described which stud comprises in combination a head, a hollow shank, a threaded sleeve within the shank having a radial arm extending therefrom, and a threaded element engaging the sleeve for positioning the radial arm with respect to the head.

8. A stud for a rotary operative fastener of the kind described which stud comprises in combination a head having a recess therein, a hollow shank having an axially extending slot therein, a threaded sleeve within the shank having a radial arm extending through the slot, and a threaded element having a head in the recess in the head of the stud and extending into the sleeve in threaded engagement therewith.

9. A rotary stud member for a separable fastener comprising, a shank portion having a head portion integral therewith, a longitudinal bore therethrough and a transverse slot therein, a threaded element axially positioned within said bore and attached to said shank portion; a nut element having lateral extensions adapted to move within said transverse slot, and a threaded connection between said nut element and said threaded element whereby said lateral extensions may be adjusted longitudinally relative to said shank portion upon adjustment of said threaded element from the head portion end of the stud member.

10. A rotary stud member for separable fastener installations comprising a hollow sleeve having a head portion and a shank portion, said shank portion being slotted transversely, a nut element mounted in said hollow sleeve and being provided with lateral extensions to extend through said slot, and a threaded element connected with said nut element and including a head portion accessible from the outside of said fastener installation for adjusting said lateral extensions longitudinally within said shank portion.

11. A rotary stud member for separable fastener installations comprising a hollow sleeve having a head portion and a shank portion, said shank portion being slotted transversely, a reversible-type nut element provided with lateral extensions extending through said slot and a threaded element rotatably attached to said hollow sleeve and threadedly connected with said nut element, the threaded element having a head portion accessible from the outside of said fastener installation for adjusting said lateral extensions longitudinally within said shank portion.

12. A rotary stud member for separable fastener installations comprising a hollow sleeve having head and shank portions, said shank portion being slotted transversely, a threaded element positioned within said hollow sleeve and rotatably attached thereto, and a nut element having lateral extensions extending through said tranverse slot, said nut element being frictionally connected to said threaded element whereby said lateral extensions may be adjusted longitudinally within said hollow sleeve to accommodate the stud member to apertured sheets of various thicknesses.

OTTO J. HUELSTER.

REFERENCES CITED

The following references are of record in the file of this patent:

UNITED STATES PATENTS

| Number | Name | Date |
| --- | --- | --- |
| 2,337,483 | Marty | Dec. 21, 1943 |